United States Patent
Dinkel et al.

(10) Patent No.: US 9,102,310 B2
(45) Date of Patent: Aug. 11, 2015

(54) HYDRAULIC UNIT

(75) Inventors: Dieter Dinkel, Schwalbach (DE);
Ronald Kley, Seligenstadt (DE); Georg Sonnenschein, Kelkheim (DE)

(73) Assignee: Continental Teves AG & Co. oHG (DE)

( * ) Notice: Subject to any disclaimer, the term of this patent is extended or adjusted under 35 U.S.C. 154(b) by 197 days.

(21) Appl. No.: 13/880,485

(22) PCT Filed: Oct. 20, 2011

(86) PCT No.: PCT/EP2011/068285
§ 371 (c)(1),
(2), (4) Date: May 20, 2013

(87) PCT Pub. No.: WO2012/052488
PCT Pub. Date: Apr. 26, 2012

(65) Prior Publication Data
US 2013/0241274 A1    Sep. 19, 2013

(30) Foreign Application Priority Data

Oct. 21, 2010 (DE) .......................... 10 2010 042 747

(51) Int. Cl.
*B60T 8/40* (2006.01)
*B60T 13/14* (2006.01)
*B60T 8/36* (2006.01)
*B60T 8/48* (2006.01)

(52) U.S. Cl.
CPC ............... *B60T 13/142* (2013.01); *B60T 8/368* (2013.01); *B60T 8/4872* (2013.01)

(58) Field of Classification Search
CPC ... B60T 8/4872; B60T 8/4283; B60T 8/4291; B60T 8/4275

USPC ......... 303/10, 116.1, 116.2, 116.3, 116.4, 87, 303/DIG. 11
See application file for complete search history.

(56) References Cited

U.S. PATENT DOCUMENTS

| | | | | |
|---|---|---|---|---|
| 5,152,586 A * | 10/1992 | Burgdorf | .................... | 303/113.2 |
| 5,390,995 A * | 2/1995 | Zirps | .......................... | 303/116.1 |
| 5,927,828 A * | 7/1999 | Beck | .......................... | 303/116.2 |
| 6,199,958 B1 | 3/2001 | Baechle | | |

(Continued)

FOREIGN PATENT DOCUMENTS

| | | |
|---|---|---|
| CN | 101489844 | 7/2009 |
| DE | 39 40 177 A1 | 6/1991 |

(Continued)

OTHER PUBLICATIONS

International Search Report for PCT/EP2011/068285 mailed Jan. 16, 2012.

(Continued)

*Primary Examiner* — Nicholas J Lane
(74) *Attorney, Agent, or Firm* — RatnerPrestia

(57) ABSTRACT

The invention relates to an hydraulic unit for a motor vehicle brake system which operates according to the feedback principle, for which purpose a low-pressure accumulator is provided between the outlet valves of the wheel brakes and a pump, and the piston of which low-pressure accumulator, in the basic position, disconnects the hydraulic connection between a pressure medium chamber and a connection leading to the pump such that, in the empty state of the low-pressure accumulator, the wheel brakes are reliably disconnected from the suction side of the pump.

11 Claims, 2 Drawing Sheets

(56) References Cited

U.S. PATENT DOCUMENTS

| | | | |
|---|---|---|---|
| 7,931,345 B2 | 4/2011 | Muller | |
| 8,042,884 B2 | 10/2011 | Weh et al. | |
| 2003/0146658 A1* | 8/2003 | Yang | 303/116.2 |
| 2004/0017105 A1 | 1/2004 | Suzuki et al. | |
| 2004/0155522 A1* | 8/2004 | Martella | 303/113.1 |
| 2007/0114840 A1* | 5/2007 | Briesewitz et al. | 303/87 |
| 2007/0296264 A1 | 12/2007 | Haupt | |
| 2010/0244552 A1* | 9/2010 | Weh et al. | 303/116.1 |
| 2012/0139332 A1* | 6/2012 | Terashima et al. | 303/115.1 |
| 2014/0060033 A1* | 3/2014 | Weh | 60/443 |

FOREIGN PATENT DOCUMENTS

| | | |
|---|---|---|
| DE | 197 09 779 A1 | 9/1998 |
| DE | 103 58 847 A1 | 1/2005 |
| DE | 10 2006 026 155 A1 | 12/2007 |
| DE | 10 2007 001 645 A1 | 7/2008 |
| EP | 0 950 004 B1 | 10/1999 |
| WO | WO 91/08130 | 6/1991 |
| WO | 9830425 | 7/1998 |
| WO | WO 2004/101308 A1 | 11/2004 |
| WO | WO 2004/113141 A1 | 12/2004 |
| WO | 2007141092 | 12/2007 |
| WO | WO 2007/041092 A1 | 12/2007 |

OTHER PUBLICATIONS

German Search Report for Application No. DE 10 2010 042 747.0 mailed Jun. 29, 2011.

Chinese Office Action for Chinese Application No. 201180050510.4 mailed Sep. 15, 2014.

* cited by examiner

HYDRAULIC UNIT

CROSS REFERENCE TO RELATED APPLICATIONS

This application is the U.S. National Phase Application of PCT/EP2011/068285, filed Oct. 20, 2011, which claims priority to German Patent Application No. 10 2010 042 747.0, filed Oct. 21, 2010, the contents of such applications being incorporated by reference herein.

FIELD OF THE INVENTION

The invention relates to a hydraulic unit for a motor vehicle brake system which operates according to the return principle.

BACKGROUND OF THE INVENTION

A hydraulic unit for a motor vehicle brake system of the type indicated is known from EP 0 950 004 B1. The hydraulic unit has, downstream of the outlet valves, a pump suction path to which a low-pressure accumulator is connected; a spring-loaded non-return valve via which the pump suction path is connected to a pump is arranged downstream of the low-pressure accumulator. Furthermore, the pump suction path is normally isolated, by means of a reversing valve which is closed in the rest position, from a pressure medium connection leading to a brake pressure sensor, it being necessary for the spring closing force on the non-return valve to be designed sufficiently large to reliably prevent pressure medium of the brake pressure sensor from flowing into the low-pressure accumulator as soon as the reversing valve is opened.

A translationally moved piston is received in a fluid-tight manner in a storage chamber provided in the low-pressure accumulator for storing the pressure medium, it being necessary, in order to ensure self-emptying of the low-pressure accumulator, for the actuating force of a piston spring to be designed large enough to be able to overcome, in addition to the piston friction, the relatively large closing force of the non-return valve spring arranged downstream of the low-pressure accumulator. During anti-lock braking control, the correspondingly strong spring-loading of the non-return valve prevents the formation of underpressure in the wheel brakes, with only low required brake pressures, while the pump is running.

The relatively large preloading force of the stiff piston spring has the disadvantage that, during anti-lock braking control, a high hydraulic actuating force is necessarily required in order that volume can be taken up by the low-pressure accumulator, which high hydraulic actuating force in turn impairs rapid pressure reduction in the wheel brakes. As already mentioned, the correspondingly strong spring-loading of the non-return valve represents a further obstacle.

SUMMARY OF THE INVENTION

An aspect of the invention aims to improve a hydraulic unit of the type indicated to the effect that, while incurring as little constructional and functional outlay as possible, better response behavior of the low-pressure accumulator and of the non-return valve is achieved.

An aspect of the invention aims to make it possible for pressure in the wheel brakes to be reduced as rapidly as possible in order both to prevent the wheels from locking in all conditions during conventional anti-lock braking control, and, during regenerative braking in which the outlet valves of the regenerative braking circuit are open, to allow the braking pressure generated by the driver predominantly to reach the low-pressure accumulator of the regenerative braking circuit and not the connected wheel brakes. A further object of the invention is considered to lie in preventing the occurrence of underpressure in the wheel brakes when the outlet valves are open and the pump is activated, without having to resort to the use of a stiff non-return valve spring.

BRIEF DESCRIPTION OF THE DRAWINGS

Further features of the invention are apparent from the individual patent claims and from the description of an exemplary embodiment with reference to two drawings, in which:

DETAILED DESCRIPTION OF THE INVENTION

Figure 1:
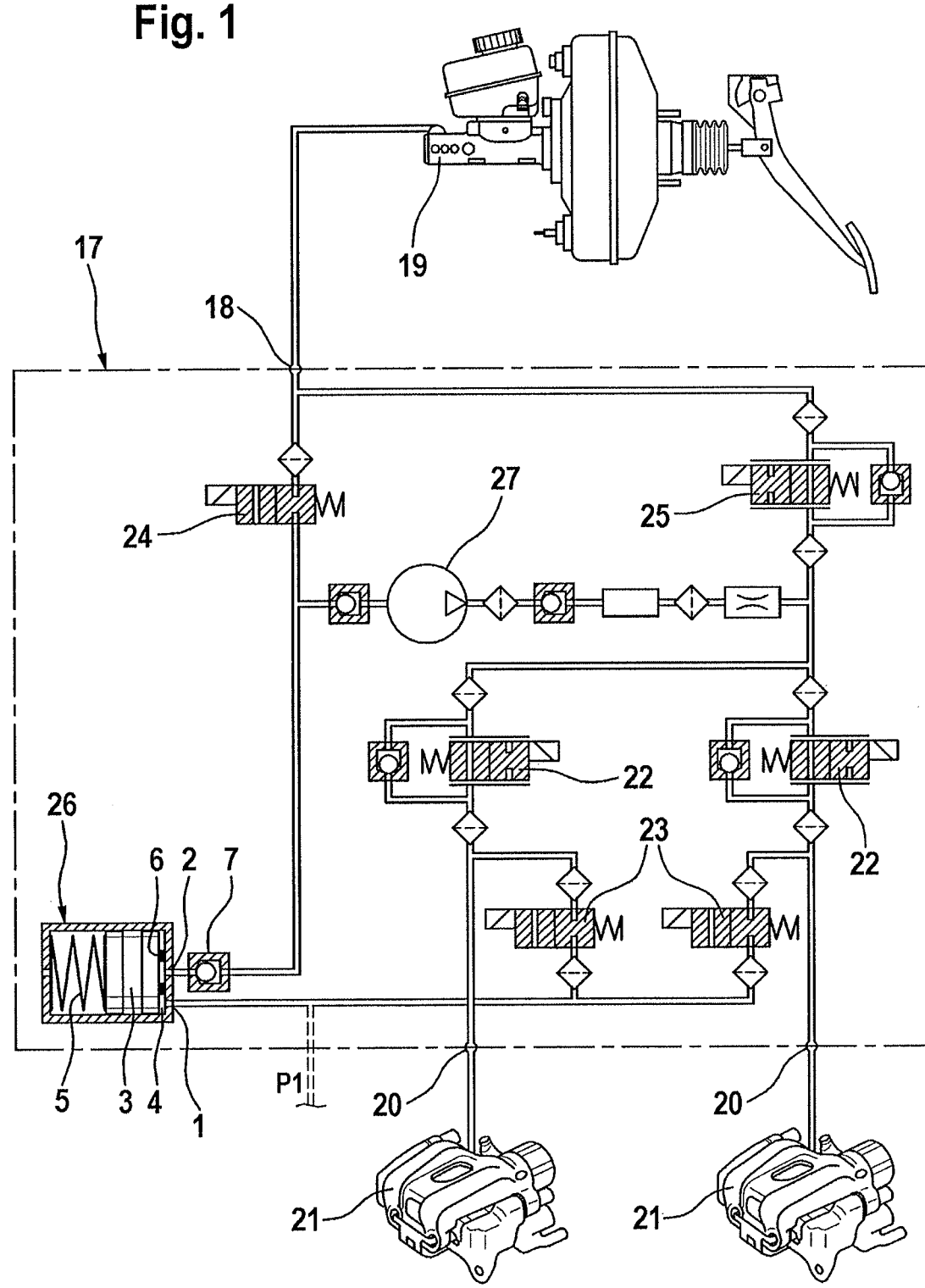
FIG. 1 is a hydraulic circuit diagram for a brake system with a schematically represented closing function of a piston arranged movably in the low-pressure accumulator.

FIG. 1 is a diagrammatic representation of the circuit structure within a hydraulic unit 17 for a motor vehicle brake system operating on the return principle. A brake circuit of a circuit arrangement implemented as a dual-circuit brake system is shown. A master cylinder connection 18 of the dual-circuit brake system connects the hydraulic unit 17 to a brake pressure generator 19, the master cylinder connection 18 being connected within the hydraulic unit 17 to the wheel brake connections 20 via a plurality of pressure regulating valves arranged in a brake circuit to which a pair of wheel brakes 21 are connected. In order to regulate the pressure within the hydraulic unit 17, an inlet and an outlet valve 22, 23 are associated with each wheel brake 21, a return line which opens via a first connection 1 into the pressure medium chamber 4 of a low-pressure accumulator being connected downstream of each outlet valve 23. The return line is connectable on the one hand to a pump 27 via a second connection 2 and a non-return valve 7 arranged in the second connection 2 downstream of the pressure medium chamber 4, but on the other hand is disconnected, outside an autonomous braking intervention, from the brake pressure generator 19 via a reversing valve 24 which is closed in the rest position.

According to the valve rest position of the electromagnetically actuable pressure regulating valves which is shown, the two inlet valves 22, as well as an isolating valve 25 arranged in the brake line between the master cylinder connection 18 and upstream of the inlet valves 22, are open when unenergized in the rest position. In conjunction with the inlet and outlet valves 22, 23, therefore, the isolating valve 25 inserted in the brake line upstream of the pump pressure connection makes possible for each brake circuit, over and above the actual anti-lock braking control function and in cooperation with the electrically actuable reversing valve 24, both traction control and autonomous braking operation, for example for the purpose of stability control.

As already mentioned, the return line connected downstream of the outlet valves 23 opens via a first hydraulic connection 1 into the pressure medium chamber 4, delimited by a piston 3, of the low-pressure accumulator 26, the pressure medium chamber 4 being connectable via the second hydraulic connection 2 both to the suction side of the pump 27 and, via the reversing valve 24, which is closed in the rest position, to the master cylinder connection 18 leading to the brake pressure generator 19, with the further feature that a non-return valve 7, which blocks in the direction of the pressure medium chamber 4, is inserted in the return line in the region of the second connection.

In order now to prevent the occurrence of underpressure in the wheel brakes 21 when the outlet valves 23 are opened and the pump 27 is activated in the context of anti-lock braking control, the invention provides that, in the rest position of the piston 3, the hydraulic connection between the pressure medium chamber 4 and the second connection 2 is disconnected while nevertheless, the pressure medium chamber 4 remains hydraulically connected to the first connection 1, so that pressure medium can at all times be discharged from the wheel brakes 21 into the pressure medium chamber 4. In the rest position of the piston 3 illustrated, therefore, the low-pressure accumulator is initially empty, or the volume content of the pressure medium chamber 4 is restricted to a minimum. In the empty state of the pressure medium chamber 4 the piston 3 is located in its rest position closing the second connection 2 as a result of the effect of the piston spring 5, so that the piston 3 assumes the function of isolating the pressure medium chamber 4 from the second connection 2 in a simple manner. Consequently, with the outlet valve 23 open the pump 27 cannot draw pressure medium from the wheel brake 21. Only when sufficient pressure medium is discharged from the wheel brakes 21 does the filling process of the pressure medium chamber 4, initiated via the first connection 1, begin, so that the second connection 2 is opened by the piston 3 only when the forces generated by the piston spring 5 and piston friction are overcome hydraulically. Consequently, the piston 3 moves away from the second connection 2 only when a sufficient degree of filling of the pressure medium chamber 4 is reached. Fluid can then flow through the non-return valve 7, inserted in the second connection 2, in the direction of the pump 27 practically without resistance since, as a result of the isolating effect of the piston 3, the provision of a non-return valve spring is in principle no longer essential.

Figure 2:
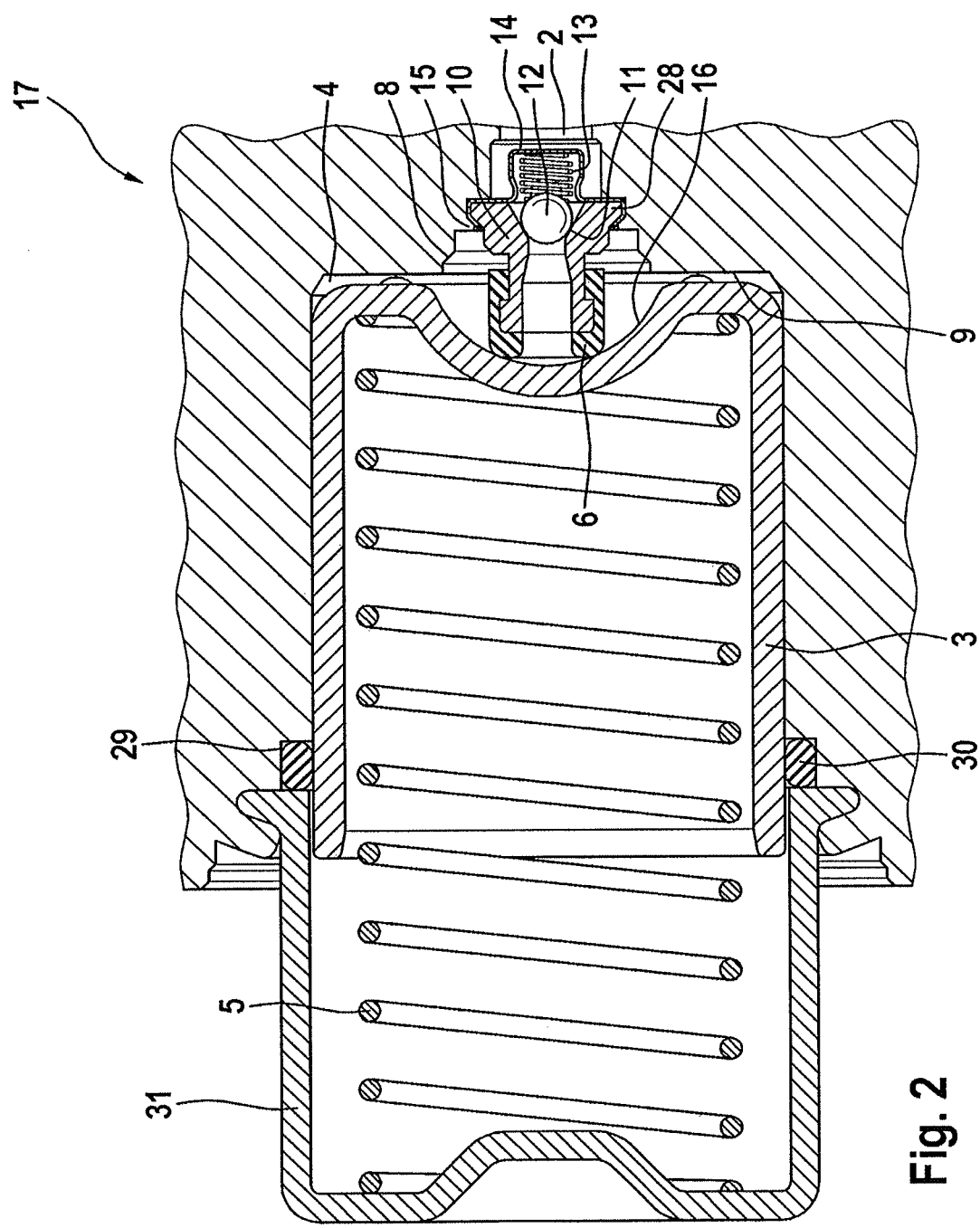
FIG. 2 shows a longitudinal section through a suitable constructional implementation of the low-pressure accumulator represented schematically in FIG. 1.

As is apparent from FIG. 2, an elastic sealing element 6 is provided between the piston 3 and the second connection 2 and ensures, in the rest position of the piston 3, an absolutely fluid-tight disconnection of the hydraulic connection provided constructionally between the second connection 2 and the pressure medium chamber 4. The sealing element 6 is combined in an especially compact structure with the non-return valve 7, which blocks in the direction of the low-pressure accumulator. 26, to form a valve assembly which can be handled independently and which is fastened non-positively in a stepped bore 8 of a housing end wall 9 of the low-pressure accumulator 26 which delimits the pressure medium chamber 4 and into which the second connection 2 opens. To achieve a suitable configuration of the non-return valve 7, the valve assembly has a substantially tubular valve housing 10, on the flared end portion of which oriented towards the second connection 2 a valve ball 12 received in a conical valve seat 11 is provided, while the elastic sealing element 6, which is retained non-positively and/or positively, preferably by vulcanization of a rubber seal, on the tubular housing 10, is fixed to the end portion of the tubular valve housing 10 oriented away from the second connection 2. In the present exemplary embodiment, the valve ball 12 is additionally positioned precisely on the valve seat by means of an especially soft spring 13, so that small hydraulic forces in the pressure medium chamber 4 are sufficient to lift the valve ball 12 from its valve seat 11 with extremely low resistance. The end of the spring 13 oriented away from the valve ball 12 is supported in a cage 14 which is fixed by means of a crimped flange 15 to a collar 28 of the tubular housing 10. At the same time, the valve housing 10 is fixed along the collar 28 in the stepped bore 8 of the low-pressure accumulator 26. For this purpose a calking die is introduced from outside into the pressure medium chamber 4 and plastically deforms the stepped bore 8 to form in the region of a step a projection which extends beyond the crimped flange 15 on an oblique shoulder of the flared collar 28. The piston 3 is therefore fitted into the pressure medium chamber 4 only after the valve assembly has been inserted and calked into the stepped bore 8. This is followed by insertion of the piston spring 5 and an O-ring 30 which seals the piston 3 in the pressure medium chamber 4, which O-ring 30 is placed in a step 29 of the pressure medium chamber 4 and covered by a collar of a closing lid 31, which is likewise fixed by calking into the low-pressure accumulator 26 at the end face of the hydraulic unit.

As can be seen from FIG. 2, the sealing element 6 of the tubular valve housing 10 extends as far as a cup-shaped depression 16 provided in the crown of the piston 3, against which the sealing element 6 rests in a fluid-tight manner in the rest position of the piston 3 illustrated, in order to isolate the second connection 2 from the pressure medium chamber 4. Together with the cup-shaped depression 16, the contour of the piston 3 and that of the closing lid 31 are produced by deep-drawing from thin sheet metal, so that a compact overall structure with a high density of integration is produced in the low-pressure accumulator 26, especially with regard to the piston spring 5, the piston 3 and the valve assembly.

LIST OF REFERENCES

1 Connection
2 Connection
3 Piston
4 Pressure medium chamber
5 Piston spring
7 Sealing element
6 Non-return valve
8 Stepped bore
9 Housing end wall
10 Valve housing
11 Valve seat
12 Valve ball
13 Spring
14 Cage
15 Crimped flange
16 Depression
17 Hydraulic unit
18 Master cylinder connection
19 Brake pressure generator
20 Wheel brake connections
21 Wheel brake
22 Inlet valve
23 Outlet valve
24 Reversing valve
25 Isolating valve
26 Low-pressure accumulator
27 Pump
28 Collar
29 Step
30 O-ring
31 Closing lid

The invention claimed is:
1. A hydraulic unit for a motor vehicle brake system comprising:
a master cylinder connection on the hydraulic unit, pressure regulating valves in the form of inlet and outlet valves in a brake circuit which is at least partially present in the hydraulic unit and is connectable via wheel brake connections on the hydraulic unit to at least one pair of wheel brakes, a return line which is connected downstream of the outlet valves in the hydraulic unit and opens via a first hydraulic connection into a pressure medium chamber of a low-pressure accumulator delimited by a piston, and is connectable via a second hydraulic connection to the pressure medium chamber and to a suction side of a pump and also, via a reversing valve which is closed in a rest position, to the master cylinder connection, a non-return valve which blocks in a direction of the pressure medium chamber and is located in the return line adjacent the second connection, and an elastic sealing element provided between the piston and the second connection, which elastic sealing element disconnects a hydraulic connection functionally provided between the second connection and the pressure medium chamber in a rest position of the piston, the sealing element combined with the non-return valve, which blocks in the direction of the pressure medium chamber, to form valve assembly, the valve assembly comprising a substantially tubular valve housing, and a valve ball received in a conical valve seat provided on an end portion of the substantially tubular valve housing that is oriented towards the second connection, the valve ball received in the conical valve seat forms the non-return valve, and the elastic sealing element is fixed to an end portion of the tubular valve housing oriented away from the second connection.

2. The hydraulic unit as claimed in claim 1, wherein, in the rest position of the piston, the pressure medium chamber is connected hydraulically to the first connection.

3. The hydraulic unit as claimed in claim 1, wherein, in the rest position of the piston in which the pressure medium chamber is connected hydraulically to the first connection while, however, the pressure medium chamber is hydraulically isolated from the second connection by the piston, a volume content of the pressure medium chamber is at a minimum.

4. The hydraulic unit as claimed in claim 3, wherein, in the rest position of the piston, the pressure medium chamber is emptied.

5. The hydraulic unit as claimed in claim 4, wherein, in an emptied state of the pressure medium chamber, as a result of an effect of a piston spring, the piston is located in its rest position closing the second connection.

6. The hydraulic unit as claimed in claim 5, wherein, at the start of a filling process of the pressure medium chamber initiated via the first connection, the second connection is opened by the piston, for which purpose the piston is moved away from the second connection against the effect of the piston spring as a result of a piston stroke.

7. The hydraulic unit as claimed in claim 1, wherein the valve assembly is fastened non-positively in a stepped bore of an end wall delimiting the pressure medium chamber, into which end wall the second connection opens.

8. The hydraulic unit as claimed in claim 1, wherein the elastic sealing element is retained on the tubular valve housing non-positively and/or positively, by vulcanization.

9. The hydraulic unit as claimed in claim 1, wherein the valve ball is loaded in a direction of the conical valve seat by a spring, for which purpose the spring is supported in a cage which is fixed by a crimped flange along a collar of the tubular valve housing.

10. The hydraulic unit as claimed in claim 1, wherein the sealing element of the tubular valve housing extends into a cup-shaped depression provided in a crown of the piston, against which the sealing element can be placed in order to isolate the second connection from the pressure medium chamber in a fluid-tight manner.

11. The hydraulic unit as claimed in claim 10, wherein a contour of the piston, together with the cup-shaped depression, is produced by deep-drawing from thin sheet metal.

* * * * *